United States Patent
Chuang et al.

(10) Patent No.: US 11,132,766 B2
(45) Date of Patent: Sep. 28, 2021

(54) IMAGE PROCESSING METHOD AND DEVICE USING MULTIPLE LAYERS OF AN OPERATING SYSTEM

(71) Applicant: Huawei Technologies Co., Ltd., Shenzhen (CN)

(72) Inventors: Kuang Ting Chuang, Shanghai (CN); Xin Jin, Shanghai (CN); Huihai Shen, Hangzhou (CN); Yuchao Lin, Shenzhen (CN); Junxiong Sun, Shanghai (CN); Xiaodong Liu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/754,567

(22) PCT Filed: Oct. 13, 2017

(86) PCT No.: PCT/CN2017/106197
§ 371 (c)(1),
(2) Date: Apr. 8, 2020

(87) PCT Pub. No.: WO2019/071618
PCT Pub. Date: Apr. 18, 2019

(65) Prior Publication Data
US 2020/0258195 A1 Aug. 13, 2020

(30) Foreign Application Priority Data
Oct. 9, 2017 (CN) .................. 201710931459.7

(51) Int. Cl.
G06T 3/40 (2006.01)
G06T 1/20 (2006.01)
G06T 1/60 (2006.01)
G09G 5/373 (2006.01)

(52) U.S. Cl.
CPC .............. G06T 3/4053 (2013.01); G06T 1/20 (2013.01); G06T 1/60 (2013.01); G09G 5/373 (2013.01);
(Continued)

(58) Field of Classification Search
CPC ........... G06T 3/4053; G06T 1/20; G06T 1/60; G09G 5/373; G09G 2340/02; G09G 2340/0407; G09G 5/227
See application file for complete search history.

(56) References Cited

U.S. PATENT DOCUMENTS

2010/0026695 A1* 2/2010 Terada ............... H04N 21/4325
345/545
2014/0340332 A1 11/2014 Lemay
2019/0130875 A1 5/2019 Zhong et al.

FOREIGN PATENT DOCUMENTS

CN 102722875 A 10/2012
CN 103761471 A 4/2014
(Continued)

OTHER PUBLICATIONS

Muhammad, H., et al., "Parameter Optimization of Fast Curvature Based Interpolation Using Genetic Algorithm",5th International Symposium on Computational Intelligence and Industrial Applications, XP055729071, ISCIIA 2012—Sapporo, Japan, 8 pages.
(Continued)

*Primary Examiner* — Maurice L. McDowell, Jr.
*Assistant Examiner* — Donna J. Ricks
(74) *Attorney, Agent, or Firm* — Conley Rose, P.C.

(57) ABSTRACT

An image processing method and device are disclosed. The method is applicable to an image processing device having an operating system, and the method includes: receiving, by an image processing module of the operating system, an instruction of a first application program to call the image
(Continued)

processing module of the operating system, where the instruction carries a to-be-displayed image and a resolution of the to-be-displayed image; and when the resolution of the to-be-displayed image is less than a first threshold, performing, by the image processing module, super-resolution processing on the to-be-displayed image, and displaying an image obtained after the super-resolution processing, to resolve a problem of a low image definition in a conventional display method.

18 Claims, 10 Drawing Sheets

(52) U.S. Cl.
CPC . *G09G 2340/02* (2013.01); *G09G 2340/0407* (2013.01)

(56) References Cited

FOREIGN PATENT DOCUMENTS

| CN | 103902318 | A | | 7/2014 | |
| --- | --- | --- | --- | --- | --- |
| CN | 103916550 | A | | 7/2014 | |
| CN | 104702846 | A | | 6/2015 | |
| CN | 102763073 | B | | 2/2016 | |
| CN | 105447820 | A | * | 3/2016 | ............... G06T 3/40 |
| CN | 105447820 | A | | 3/2016 | |
| CN | 105808356 | A | | 7/2016 | |
| CN | 106339061 | A | | 1/2017 | |
| CN | 106408632 | A | * | 2/2017 | ............ G06T 13/80 |
| CN | 106603885 | A | | 4/2017 | |
| CN | 106919401 | A | | 7/2017 | |
| CN | 107025629 | A | | 8/2017 | |
| WO | 2017166210 | A1 | | 10/2017 | |

OTHER PUBLICATIONS

"Android ImageView example," XP055728854, Sep. 28, 2017, 12 pages.

Shengqian, Y., et al., "Testing for poor responsiveness in android applications",2013 1st International Workshop on the Engineering of Mobile-Enabled Systems (MOBS), XP032492146, Sep. 30, 2013, 6 pages.

\* cited by examiner

201a

A first application program sends an instruction to an image processing module of an operating system to call the image processing module to perform image optimization 202a When determining that a resolution of the to-be-displayed image is less than a first threshold, the image processing module performs super-resolution processing on the to-be-displayed image and displays an image obtained after the super-resolution processing

FIG. 3

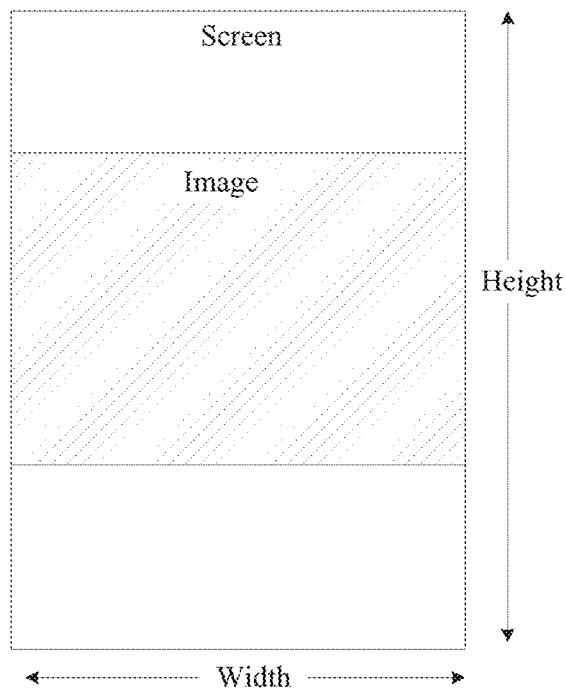

FIG. 4

IMAGE PROCESSING METHOD AND DEVICE USING MULTIPLE LAYERS OF AN OPERATING SYSTEM

CROSS-REFERENCE TO RELATED APPLICATIONS

This application is a National Stage of International Patent Application No. PCT/CN2017/106197 filed on Oct. 13, 2017, which claims priority to Chinese Patent Application No. 201710931459.7 filed on Oct. 9, 2017. Both of the aforementioned applications are hereby incorporated by reference in their entireties.

TECHNICAL FIELD

This application relates to the field of terminal technologies, and in particular, to an image processing method and device.

BACKGROUND

In recent years, with rapid development of the electronic industry and communications technologies, new services on basis of data, voice, and videos develop rapidly. Fast development of microelectronics technologies and computer software and hardware technologies lays a foundation for increasingly complex processing of image processing devices and makes personalization of the image processing devices possible, so that a terminal is no longer restricted by a network to some extent and may have increasingly powerful functions. In addition, users also have urgent requirements for terminals, and expect the terminals to have more powerful, more flexible, and more convenient functions. Development of information technologies enables intelligent, mobile, and multi-functional terminal technologies.

As mobile terminals are increasingly popular, particularly, as smartphones develop progressively, people's life becomes more convenient and people can enjoy achievements brought by advanced technologies. Intelligent mobile terminals such as smartphones are accepted by more people owing to many advantages such as powerful operating systems, large-capacity storage space, and convenience in installing various software. In comparison with conventional mobile terminals, the intelligent mobile terminals can install more third-party applications. In an intelligent mobile terminal having an Android (Android) system, the operating system generally sequentially includes an application layer, a framework layer, a runtime, a core class library, a hardware abstraction layer, and a Linux kernel layer. Generally, each Android application developer develops applications based on implementation of core functions of the Android system, including the framework layer, the core class library, and the like. The application layer of the Android system consists of all applications running on the Android device. The application layer not only includes system applications (pre-installed on the intelligent mobile terminal along with the Android system) such as a call application, a short message application, a contacts application, and the like, but also includes other third-party applications subsequently installed on the device. The third-party applications are developed based on a software development kit (software development kit, SDK) provided by Android and are restricted by an SDK interface. The system applications pre-installed on the device may call interfaces and modules of the entire framework layer. In an operating system of an existing intelligent mobile terminal, after being installed and obtaining a system grant, a third-party application can directly call a control interface from an Android framework layer. For example, during image display, an application program usually calls an ImageView control at the framework layer of the Android system to draw an image. However, to reduce traffic during the image display, many image details are compressed in consideration of frequency bandwidth, resulting in a low image resolution.

SUMMARY

This application provides an image processing method and device, to resolve the following problem: A resolution is low when an application program in an existing terminal device displays image information.

According to a first aspect, an embodiment of this application provides an image processing method. The method is applicable to an image processing device having an operating system, including: receiving, by an image processing module of the operating system, an instruction of a first application program to call the image processing module of the operating system. Because the instruction carries a to-be-displayed image, the image processing module performs image optimization processing on the to-be-displayed image and displays an image obtained after the image optimization processing.

According to the foregoing method, the image processing module of the operating system of the image processing device is improved, and an image optimization function is added, to perform image optimization processing on to-be-displayed images in different application programs at an application layer. To be specific, when a multimedia file in an application program calls an interface of the image processing module of the operating system to display an image, an image optimization processing process of the image processing module is first performed, and an optimized image is eventually displayed. For example, the optimized image has an increased resolution and has higher definition.

In a possible design, the operating system is an Android operating system and the image processing module is an ImageView class at a framework layer of the Android operating system. In this way, the ImageView class can obtain a width and a height of the to-be-displayed image from the instruction, and then the ImageView class determines that the width and the height of the to-be-displayed image meet a specified condition. The specified condition is as follows: a difference between a height of a screen of the image processing device and the height of the to-be-displayed image is less than a second threshold; and/or a difference between a width of the screen of the image processing device and the width of the to-be-displayed image is less than a third threshold. In other words, the ImageView class can perform image optimization on only an image of a sufficient size, and this can improve image optimization efficiency.

In a possible design, the operating system is an Android operating system and the image processing module is a BitmapFactory class at a framework layer of the Android operating system. In this case, before the image processing module performs image optimization processing on the to-be-displayed image, the to-be-displayed image is decoded. This method mainly compensates for image optimization in a scenario in which the application program has an ImageView class. Because when the application program at the application layer already has an ImageView class, ImageView at the framework layer is not called, but the BitmapFactory class (BitmapFactory) of the framework layer still is called, to decode the to-be-displayed image and obtain a decoded image. Therefore, the image optimization function can be extended on BitmapFactory. In this case, once an application program at the application layer calls this interface, image optimization is triggered.

In a possible design, when determining that a resolution of the to-be-displayed image is less than a first threshold, the image processing module performs super-resolution processing on the to-be-displayed image. With super-resolution processing, the resolution of the original image can be adjusted, and therefore the optimized image has higher definition.

In a possible design, the image processing module may further determine, based on an identifier of the first application program in the instruction, that the first application program has a super-resolution processing permission. Apparently, this can improve the image optimization efficiency and facilitate centralized processing of multimedia files having an image element.

Optionally, the image processing module determines whether the identifier of the first application program exists in a preset whitelist, if the identifier of the first application program exists in the preset whitelist, the image processing module determines that the first application program has an image optimization permission; or if the identifier of the first application program does not exist in the preset whitelist, the image processing module does not perform image optimization on the image of the application program. The whitelist can be updated by a user anytime and therefore is easy to be controlled.

Specifically, a method for performing super-resolution processing on the to-be-displayed image by the image processing module may be: adding, by the image processing module, the to-be-displayed image to a task queue as a task object; and determining, by the image processing module based on the resolution of the to-be-displayed image, an image optimization algorithm corresponding to the to-be-displayed image; and performing, by the image processing module by using the corresponding image optimization algorithm, super-resolution processing on the task object corresponding to the to-be-displayed image in the task queue.

In addition, after determining that the super-resolution processing on the task object corresponding to the to-be-displayed image is completed, the image processing module releases memory space corresponding to the task object, to facilitate memory management.

In addition, a first task in the task queue is allocated to a first processor to perform super-resolution processing, and a second task in the task queue is allocated to a second processor to perform super-resolution processing, to implement heterogeneous acceleration.

According to a second aspect, an embodiment of this application provides an image processing apparatus. The image processing apparatus has a function of implementing behaviors of the image processing module in the operating system in the foregoing method embodiment. The function may be implemented by hardware by executing corresponding software. The hardware or software includes one or more modules corresponding to the foregoing function.

In a possible design, the image processing apparatus includes a receiving unit and a processing unit, where the receiving unit is configured to receive an instruction of the first application program to call an image processing module of the operating system, where the instruction carries a to-be-displayed image; and the processing unit is configured to perform image optimization processing on the to-be-displayed image and display an image obtained after the image optimization processing.

In a possible design, the processing unit is specifically configured to: when determining that a resolution of the to-be-displayed image is less than a first threshold, perform super-resolution processing on the to-be-displayed image.

In another possible design, the image processing apparatus further includes a determining unit, configured to determine, based on an identifier of the first application program, that the first application program has a super-resolution processing permission.

Further, the determining unit is specifically configured to: determine whether the identifier of the first application program exists in a preset whitelist; and if the identifier of the first application program exists in the preset whitelist, determine that the first application program has an image optimization permission.

In a possible design, the processing unit is specifically configured to:

add the to-be-displayed image to a task queue as a task object;

determine, based on the resolution of the to-be-displayed image, an image optimization algorithm corresponding to the to-be-displayed image; and perform, by using the corresponding image optimization algorithm, super-resolution processing on the task object corresponding to the to-be-displayed image in the task queue.

Further, the processing unit is further configured to: after determining that the super-resolution processing on the task object corresponding to the to-be-displayed image is completed, release memory space corresponding to the task object.

In addition, in a possible design, a first task in the task queue is allocated to a first processor to perform super-resolution processing, and a second task in the task queue is allocated to a second processor to perform super-resolution processing, to accelerate image processing.

In a possible design, the image processing apparatus is an ImageView class in the operating system, and the instruction further includes a width and a height of the to-be-displayed image. The processing unit is further configured to determine that the width and the height of the to-be-displayed image meet a specified condition, where the specified condition is as follows: a difference between a height of a screen of the terminal device and the height of the to-be-displayed image is less than a second threshold; and/or a difference between a width of the screen of the terminal device and the width of the to-be-displayed image is less than a third threshold.

In a possible design, the image processing apparatus is a BitmapFactory class at a framework layer of an Android operating system. In this case, before performing image optimization processing on the to-be-displayed image, the image processing apparatus decodes the to-be-displayed image.

According to a third aspect, an embodiment of this application provides an image processing device. The image processing device includes a memory, a display, and a processor. The processor may be a central processing unit (central processing unit, CPU), a digital processing unit, or the like. The processor performs an image optimization function based on an instruction of a first application program to call an image processing module of an operating system. The memory is configured to store an instruction of the first application program, a program instruction of the operating system, and a program to be executed by the processor.

The display is configured to display, on a human-computer interaction interface of the first application program, an image obtained after image optimization processing performed by the processor.

Specifically, when the processor is configured to: when determining that a resolution of the to-be-displayed image is less than a first threshold, perform super-resolution processing on the to-be-displayed image.

In a possible design, the instruction of the first application program further includes an identifier of the first application program. The processor is further configured to determine, based on the identifier of the first application program, that the first application program has a super-resolution processing permission.

In a possible design, the processor is specifically configured to: determine whether the identifier of the first application program exists in a preset whitelist; and if the identifier of the first application program exists in the preset whitelist, determine that the first application program has an image optimization permission.

In a possible design, the processor is specifically configured to: add the to-be-displayed image to a task queue as a task object; and determine, based on the resolution of the to-be-displayed image, an image optimization algorithm corresponding to the to-be-displayed image; and perform, by using the corresponding image optimization algorithm, super-resolution processing on the task object corresponding to the to-be-displayed image in the task queue.

In a possible design, the operating system is an Android operating system, the image processing module is an ImageView class or a BitmapFactory class at a framework layer of the Android operating system, and the processor may optimize an image in the following two manners:

Manner 1: The processor determines that a width and a height of the to-be-displayed image meet a specified condition and performs super-resolution processing on an image that meets the condition. The specified condition is as follows: a difference between a height of a screen of the image processing device and the height of the to-be-displayed image is less than a second threshold; and/or a difference between a width of the screen of the image processing device and the width of the to-be-displayed image is less than a third threshold.

Manner 2: The processor decodes the to-be-displayed image and performs super-resolution processing on an image that meets a condition.

In a possible design, the processor is further configured to: after determining that the super-resolution processing on the task object corresponding to the to-be-displayed image is completed, release memory space corresponding to the task object.

In a possible design, a first task in the task queue is allocated to a first processor to perform super-resolution processing, and a second task in the task queue is allocated to a second processor to perform super-resolution processing, to implement heterogeneous acceleration.

According to a fourth aspect, an embodiment of this application further provides a computer storage medium, where the storage medium stores a software program, and when the software program is read and executed by one or more processors, the method provided in any design of the first aspect can be implemented.

According to a fifth aspect, an embodiment of this application further provides a computer program product, and when the computer program product is executed by a computer, the computer is enabled to execute the method provided in any design of the first aspect.

In the solutions provided in the embodiments of this application, the image processing module in the operating system is improved and it is unnecessary to develop each application program separately. Therefore, the solutions are highly reusable. In addition, when image information of multimedia files from different application programs is displayed, automatic image optimization is implemented, thereby improving user experience.

BRIEF DESCRIPTION OF DRAWINGS

FIG. 3 is a schematic flowchart of an image processing method according to an embodiment of this application;

FIG. 4 is a schematic diagram of a method for determining full occupation of a screen according to an embodiment of this application;

DESCRIPTION OF EMBODIMENTS

The following further describes in detail embodiments of this application with reference to accompanying drawings.

Figure 1:
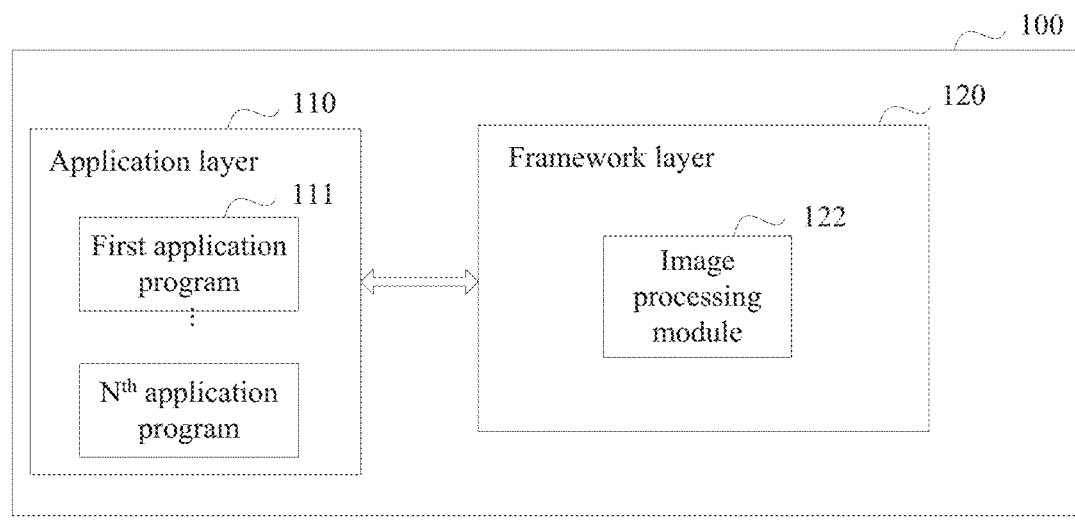
FIG. 1 is a schematic structural diagram of an image processing device according to an embodiment of this application.

An image processing method provided in an embodiment of the present invention is applicable to an image processing device shown in FIG. 1. The image processing device includes an application layer 110 and a framework layer 120. The application layer 110 includes a first application program 111 and a plurality of other application programs, and the framework layer 120 includes an image processing module 122. The image processing module 122 receives an image transmitted by the first application program 111 and is configured to perform image optimization processing on the image. The image processed by the image processing module 122 is transmitted to the first application program 111, so that the first application program 111 displays the processed image. It can be understood that the framework layer 120 further includes a storage module, configured to buffer a to-be-processed image and a processed image. The following image processing process is used as an example to describe a workflow of the image processing module.

After receiving a to-be-displayed image, the image processing module 122 first obtains a resolution of the to-be-displayed image and determines whether the resolution is less than a threshold, and if the resolution is less than the threshold, performs super-resolution processing on the to-be-displayed image and displays an image obtained after the super-resolution processing. The so-called super-resolution processing means increasing a resolution of an original image by using a hardware or software method. A process of obtaining a high-resolution image through a series of low-resolution images is super-resolution reconstruction. The image processing module 122 returns the image obtained after the super-resolution processing to the first application program 111 for display on an interface.

Figure 2:
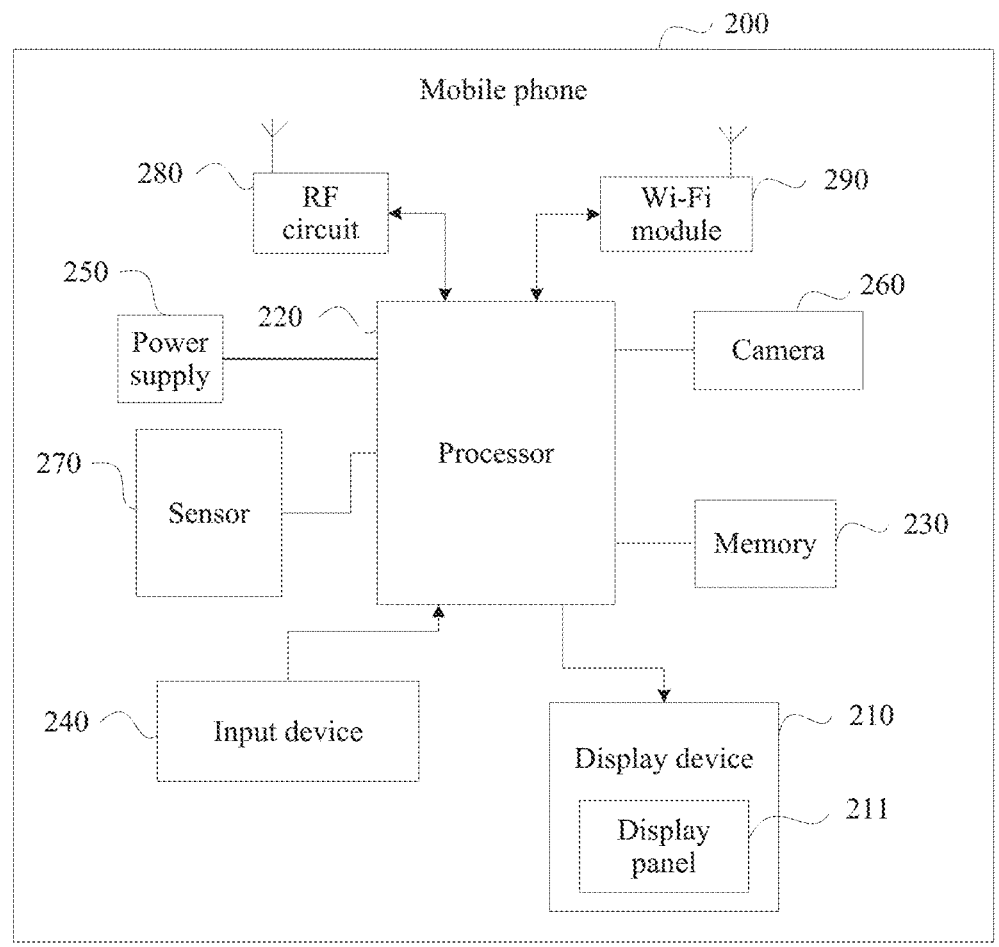
FIG. 2 is a schematic structural diagram of a mobile phone according to an embodiment of this application.

An image processing method provided in this embodiment of the present invention is also applicable to a mobile phone shown in FIG. 2. The following first briefly describes a specific structural composition of the mobile phone.

FIG. 2 is a schematic structural diagram of hardware of a mobile phone applied to an embodiment of this application. As shown in FIG. 2, a mobile phone 200 includes a display device 210, a processor 220, and a memory 230. The memory 230 may be configured to store a software program and data, and the processor 220 runs the software program and the data that are stored in the memory 230, to execute various function applications of the mobile phone 200 and perform data processing. The memory 230 may mainly include a program storage area and a data storage area. The program storage area may store an operating system, an application program required by at least one function (such as an image capture function), and the like; and the data storage area may store data (such as audio data, a phone book, and an image) created based on use of the mobile phone 200, and the like. In addition, the memory 230 may include a high-speed random access memory, and may further include a nonvolatile memory, for example, at least one magnetic disk storage device, a flash memory device, or another volatile solid-state storage device. The processor 220 is a control center of the mobile phone 200, and is connected to all parts of the entire mobile phone by using various interfaces and lines. The processor 220 runs or executes the software program and/or the data that are/is stored in the memory 230, to perform various functions of the mobile phone 200 and perform data processing, thereby performing overall monitoring on the mobile phone. The processor 220 may include one or more general purpose processors, may further include one or more DSPs (digital signal processor, digital signal processor), and may also include one or more ISPs (image signal processor, image signal processor), and is configured to perform related operations, to implement the technical solutions provided in the embodiments of this application.

The mobile phone 200 further includes a camera 260 for capturing an image or shooting a video. The camera 260 may be a common camera, or may be a focus camera.

The mobile phone 200 may further include an input device 240, configured to receive digital information, character information, or a contact touch operation/non-contact gesture that is input, and generate signal input that is related to user settings and function control of the mobile phone 200, and the like.

The display device 210 includes a display panel 211, configured to display information that is input by a user, information provided for a user, various menu interfaces of the mobile phone 200, and the like, and is mainly configured to display a to-be-detected image obtained by a camera or a sensor in the mobile phone 100 in this embodiment of this application. Optionally, the display panel 211 may be configured in a form of a liquid crystal display (liquid crystal display, LCD), an OLEO (organic light-emitting diode, organic light-emitting diode), or the like.

In addition to the foregoing parts, the mobile phone 200 may further include a power supply 250, configured to supply power to other modules. The mobile phone 200 may further include one or more sensors 270, such as an image sensor, an infrared sensor, and a laser sensor. The mobile phone 200 may further include a radio frequency (radio frequency, RF) circuit 280, configured to perform network communication with a wireless network device, and may further include a Wi-Fi module 290, configured to perform Wi-Fi communication with another device to obtain images, data, or the like transmitted by the another device.

Based on the foregoing description, the embodiments of this application provide an image processing method and an image processing device, to resolve a problem of unclear image display of a multimedia file in an application program. In this application, the method and the image processing device are based on a same inventive concept. Because the method and the image processing device have similar problem-resolving principles, reference may be mutually made to implementations of the image processing device and the method. No repeated description is provided.

In the embodiments of this application, the image processing module of the operating system of the image processing device is mainly improved and an image optimization function is added, to perform image optimization processing on to-be-displayed images in different application programs at an application layer. That is, in the embodiments of this application, layers (such as a framework layer) in the operating system other than the application layer are improved, an image optimization program is added, and related hardware is called to implement optimization processing. When a multimedia file in the application program calls the image processing module of the operating system for image display, an image optimization processing process of the image processing module is first performed, and an optimized image is eventually displayed. In this case, a resolution is increased, and higher definition is also achieved. In the embodiments of this application, the image processing module in the operating system is improved and it is unnecessary to develop each application program separately. A user operating an application program at the application layer is unaware of the entire image optimization process. Therefore, the method is highly reusable and more automated.

In the following, some terms in this application are described, to help a person skilled in the art has a better understanding.

(1) An application program in the embodiments of this application is software having a visualized user interface and enabling human-machine interaction with a user, for example, a short message application, a multimedia message application, various email applications, a microblog, WeChat, Tencent chatting software (QQ), Line (Line), photo sharing (Instagram), DingTalk, TouTiao, or a browser. By using an application, a user may share information such as text, voice, an image, a video file, and various other files with another contact, or obtain the foregoing information.

(3) An image processing device in the embodiments of this application is also referred to as user equipment (User Equipment, UE), and is a device on which various communications applications can be installed or a device having a communication function, for example, a smartphone, a tablet, all kinds of wearable devices, a vehicle-mount device, or a computer.

(4) An image in the embodiments of this application comes from a multimedia file. The multimedia file is an image, an image collection, or a video file composed of multi-frame images.

With reference to the operating system architecture of the image processing device in FIG. 1, a specific process of an image processing method is described in detail in the following embodiments of this application. Referring to FIG. 3, a specific procedure of the method may include the following steps.

Step 201a. A first application program sends an instruction to an image processing module of an operating system to call the image processing module to perform image optimization.

Specifically, when detecting that a user is viewing an image, the first application program sends the instruction to the image processing module. For example, the user receives an image sent by a friend when using WeChat. In a dialog interface of WeChat, the received image is displayed in a thumbnail. When the user taps the thumbnail to view a large version of the image, WeChat calls the image processing module.

Step 202a. When determining that a resolution of the to-be-displayed image is less than a first threshold, the image processing module performs super-resolution processing on the to-be-displayed image and displays an image obtained after the super-resolution processing.

In step 202a, because the instruction carries the to-be-displayed image and the resolution of the to-be-displayed image, the image processing module may first obtain the resolution of the to-be-displayed image and then perform determining on the resolution. If determining that the resolution is less than the first threshold, the image processing module starts super-resolution processing; or if determining that the resolution is not less than the first threshold, the image processing module does not perform super-resolution processing. Herein, the image optimization processing is described by using an example of super-resolution processing.

It should be noted that, in addition to the image optimization method of super-resolution processing, another image optimization method may further be used to optimize an image, for example, adjust brightness, saturation, or a color of the image, beautifying a human face, or the like. Alternatively, these image optimization methods may be used together, or different image optimization methods may be triggered based on different detection conditions. For example, when it is identified that a current mode is a night reading mode, brightness of an image is reduced; or when it is identified that an image includes a human face, an image optimization method for beautifying the human face is performed, or the like.

In consideration that image optimization processing aims to achieve an image quality improvement, and such an improvement has different impact and significance for users in different applications. For example, a user of a microblog usually browses short videos or photos, and therefore this type of application program such as the microblog has a relatively high requirement for an image resolution. For another example, in a mailbox application, an email includes mostly text information, and usually has only a small amount of image information or no image information inserted, and therefore this type of application program has a relatively low requirement for an image resolution. If consideration is performed based on frequency bandwidth as in a conventional method, some pixels are lost, which reduces an image resolution and severely affects user experience. Therefore, in a possible design, the image processing module further determines, based on an identifier of the first application program carried in the instruction, whether the first application program has an image optimization permission, and performs image optimization on an application program that has the image optimization permission.

That is, the image processing module restores a whitelist having the image optimization permission and the whitelist includes identifiers of application programs at the application layer. If the image processing module determines that the identifier of the application program obtained in the instruction is in the whitelist, the application program apparently has the image optimization permission, and super-resolution processing may be further triggered; or if the image processing module determines that the identifier of the application program obtained in the instruction is not in the whitelist, super-resolution processing is not performed. Alternatively, the image processing module authenticates the identifier of the application program. If the authentication succeeds, it is proved that the application program has the image optimization permission, and super-resolution processing may be further triggered. If the authentication fails, super-resolution processing is not performed.

In another possible design, to improve image processing efficiency, before super-resolution processing is performed, another condition may further be used to further determine whether the to-be-displayed image needs image optimization. For example, after obtaining an image, the image processing module determines whether super-resolution processing has been performed on the image. If super-resolution processing has been performed on the image, super-resolution processing is not performed on the image again.

In consideration that when many to-be-displayed images exist application program, the image processing module encounters relatively high performance and memory load. Therefore some images may be filtered out, for example, an image with a size meeting a preset condition is processed. For example, the image processing module determines whether an image size of the to-be-displayed image is close to that of a full screen. Super-resolution processing is performed only when the image size is close to that of the screen. As shown in FIG. 4, a width of the to-be-displayed image is consistent with a width of the screen, and therefore the to-be-displayed image meets the condition for performing super-resolution processing. In actual operations, image widths of some applications are slightly less than the width of the screen. Therefore, when a difference between a height of the screen and a height of the to-be-displayed image is less than a second threshold, or when a difference between the width of the screen of the image processing device and the width of the to-be-displayed image is less than a third threshold, that is, when either of the two conditions is met, super-resolution processing is performed on the to-be-displayed image. The second threshold and the third threshold may be same. For example, when the width of the to-be-displayed image meets [0.95, 1.0] times the width of the screen, or when the height of the to-be-displayed image meets [0.95, 1.0] times the height of the screen, super-resolution processing may still be performed.

At present, a common operating system used by the image processing device is an Android operating system. An embodiment of this application further describes the foregoing image processing method with reference to a system architecture of the Android operating system. From a high layer to a low layer, the Android operating system generally sequentially includes: an application layer, a framework layer, a runtime, a core class library, a hardware abstraction layer, and a Linux kernel layer. The image processing module in this embodiment of this application belongs to a functional module at the framework layer.

Figure 5:
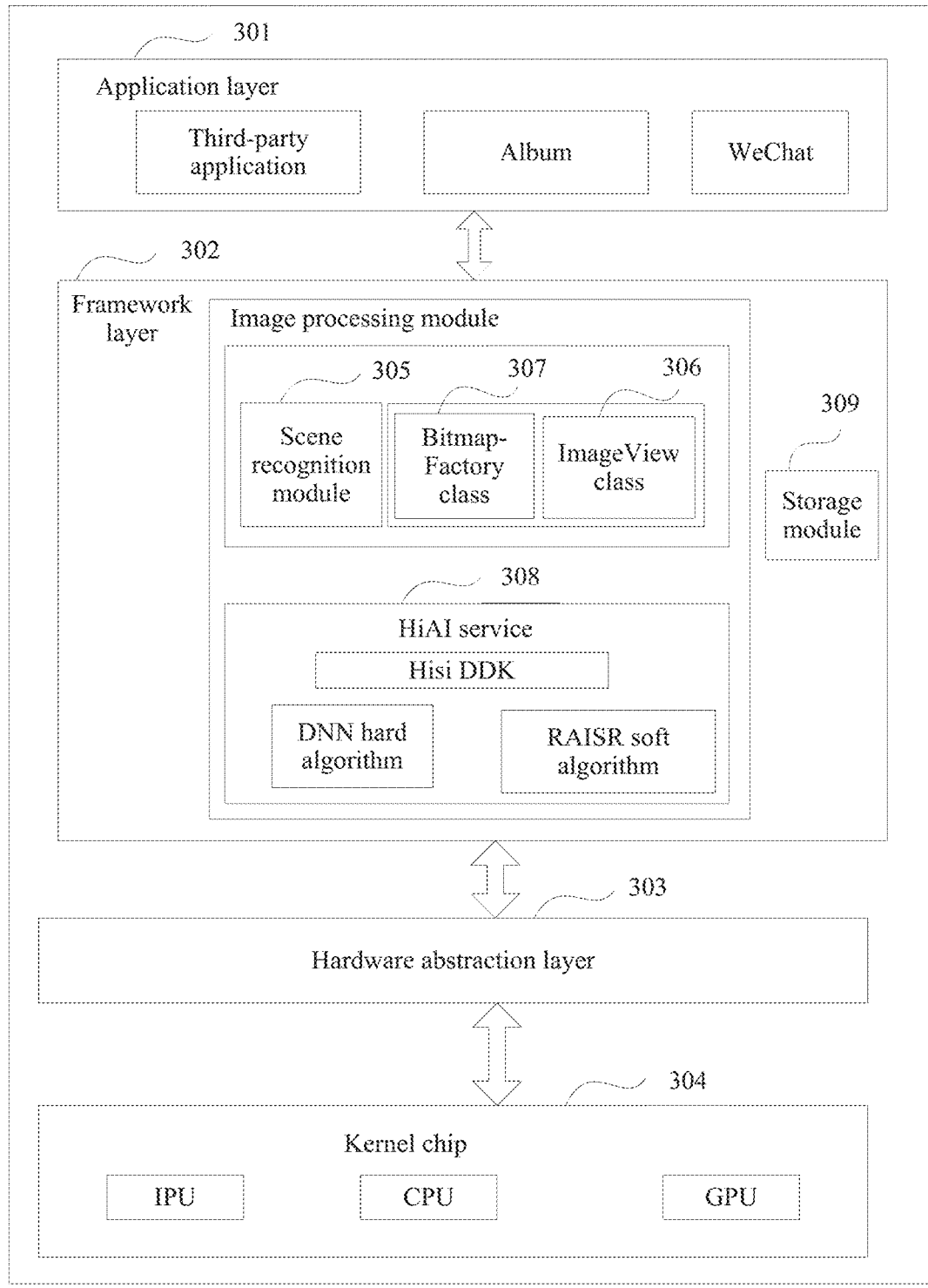
FIG. 5 is a schematic diagram of an Android operating system framework having an image optimization function according to an embodiment of this application.

As shown in FIG. 5, an Android operating system architecture having an image optimization function includes an application layer 301, a framework layer 302, a hardware abstraction layer 303, and a kernel chip 304. A scene recognition module 305 in an image processing module at the framework layer is configured with various conditions for determining whether image optimization is needed, for example, determining whether a first application program that calls the image processing module exists in a whitelist for image optimization, whether a to-be-displayed image needs to be displayed in full screen, whether a width or a height of the to-be-displayed image is close to a width or a height of a screen, whether a resolution of the to-be-displayed image meets a resolution threshold, whether the to-be-displayed image includes a human face, or the like. An ImageView class (ImageView) 306 and a BitmapFactory class (BitmapFactory) 307 are configured to perform image optimization on the to-be-displayed image, and may specifically manage a task queue and memory calling for image optimization. An image optimization algorithm in a HiAI service is called to perform optimization processing the image. An HiAI service platform 308 at the framework layer includes various image optimization algorithms, such as a DNN hard algorithm, a RAISR soft algorithm, and the like. The DNN hard algorithm is a super-resolution image hard algorithm, and performance and an effect are improved through interaction with a neural network processor (IPU). The RAISR soft algorithm is a super-resolution image soft algorithm and is mainly specific to low- and mid-range image processing devices without IPU hardware. In addition, the framework layer further includes a storage module 309, whose function is already illustrated in FIG. 1 and is not described herein in detail again.

Application programs at the application layer are different. Some application programs may call the ImageView class (ImageView) 306 to draw an image, while some application programs may not call ImageView but call the BitmapFactory class (BitmapFactory) 307. Therefore, the image processing module specifically implements image optimization mainly in the following two manners.

Figure 6:
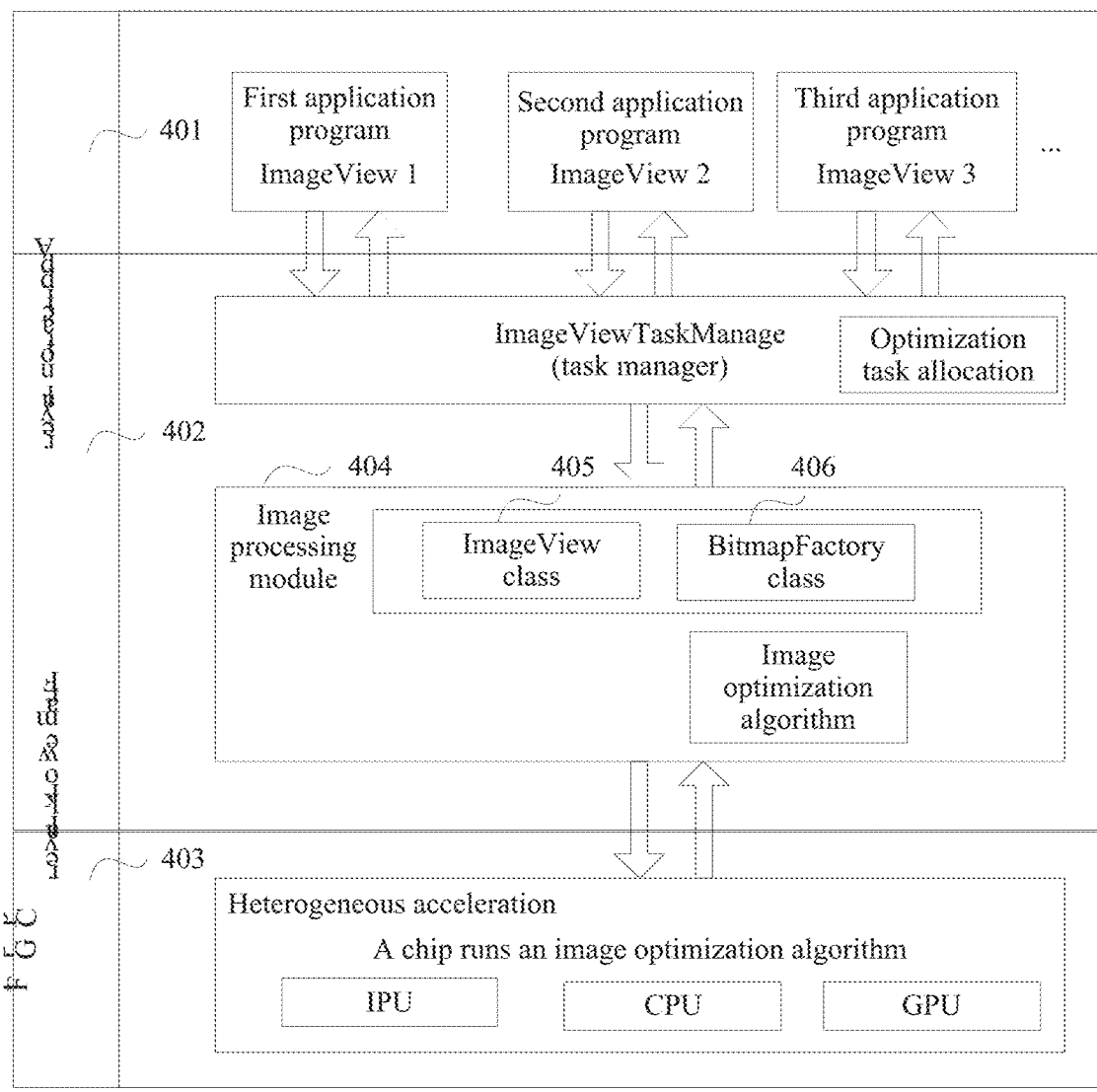
FIG. 6 is a schematic diagram of an ImageView class integrating an image optimization function according to an embodiment of this application.

Manner 1: Most application programs at the application layer may call the ImageView class 306 to display an image, and therefore a capacity of the image optimization function can be expanded on the ImageView class. In this case, the application programs at the application layer may call the ImageView class to trigger the foregoing image processing method. As shown in FIG. 6, when different application programs at an application layer 401 display images, ImageView classes are created separately, for example, ImageView 1 of a first application program, ImageView 2 of a second application program, and ImageView 3 of a third application program. An image processing module 404 at a framework layer 402 is further triggered to call a heterogeneous processor 403 to perform image optimization and an ImageView class 405 in the image processing module 404 is further triggered to call an image optimization algorithm to perform image optimization processing. In a process of performing image optimization processing, the image processing module performs heterogeneous acceleration by using a plurality of processors, to accelerate the image optimization process.

Figure 7:
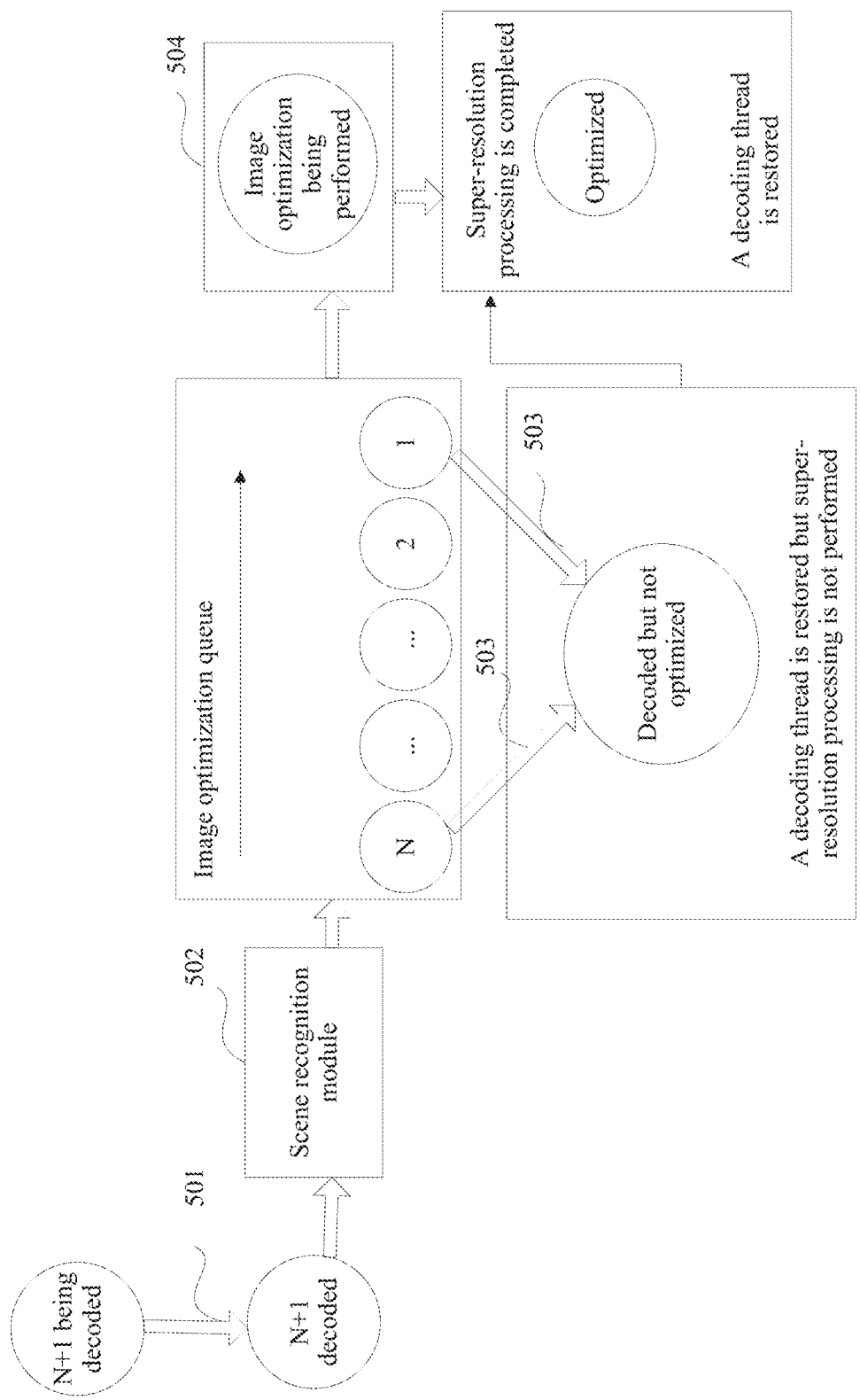
FIG. 7 is a schematic diagram of a BitmapFactory class integrating an image optimization function according to an embodiment of this application.

Manner 2: When an application program at the application layer 401 already has the ImageView class 405, the application program does not call ImageView at the framework layer 402, but still calls a BitmapFactory class (BitmapFactory) 406 at the framework layer, to decode a to-be-displayed image and obtain a decoded image. Therefore, the image optimization function can be extended on BitmapFactory. In this case, once the application program at the application layer calls the BitmapFactory class, the image processing method is triggered. As shown in FIG. 7, in step 501, in an image display process, a first application program at an application layer calls BitmapFactory at a framework layer of an operating system to decode a multimedia file; in step 502, a scene recognition module performs a series of condition-based determining on the decoded image, for example, identification of a resolution value, and an image that meets a condition is added to an image optimization queue; in step 503, in consideration that some images such as the first few images or the last few images usually include unimportant information, image optimization on these images may be directly skipped; and in step 504, after filtering, super-resolution processing is sequentially performed on remaining images.

Figure 8A:
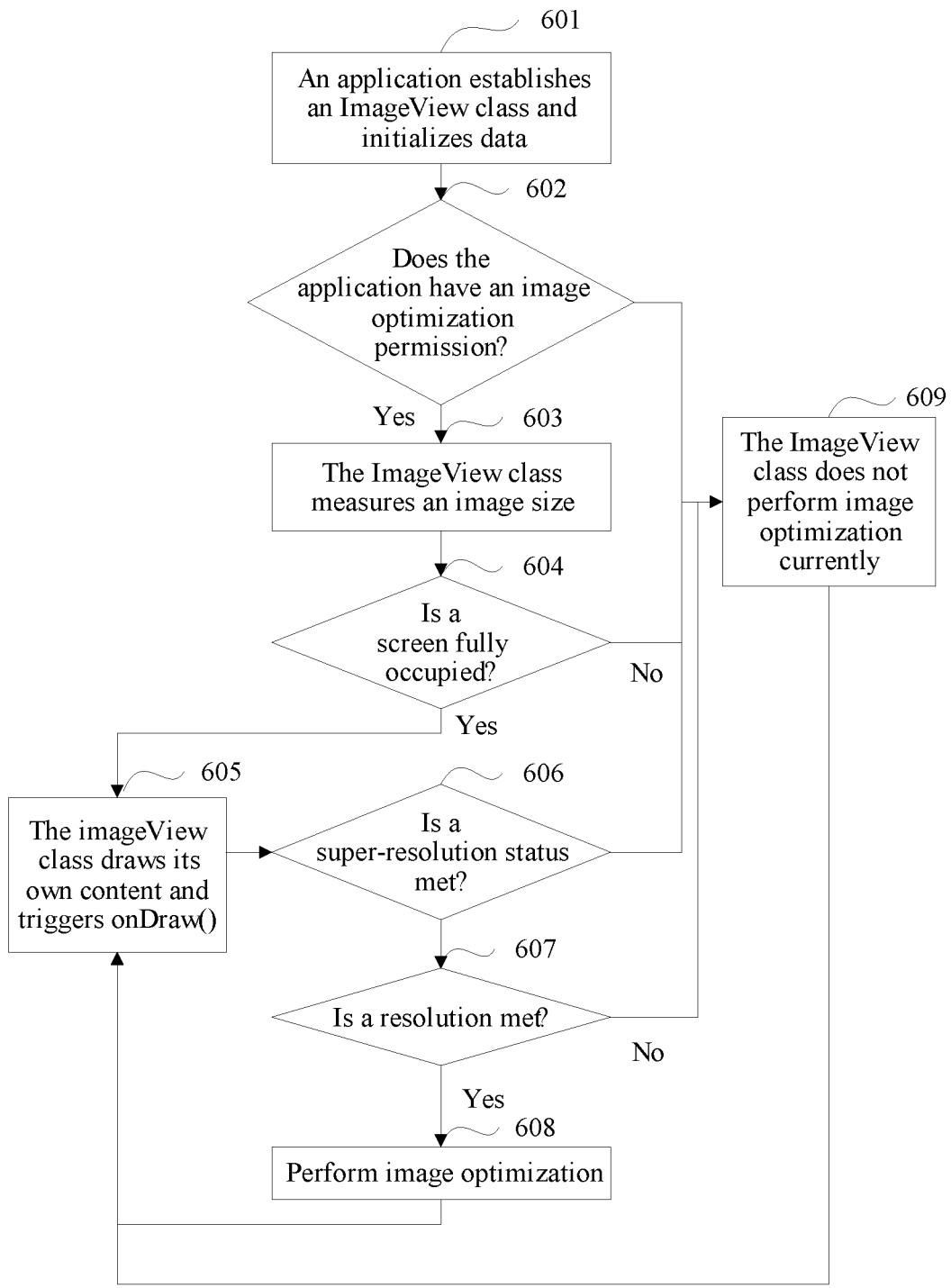
FIG. 8A is schematic flowchart 1 of an image optimization method of an ImageView class according to an embodiment of this application.

For Manner 1, specifically, in an Android operating system, a most commonly used image display module is ImageView (image view module). According to analysis of Android ImageView source code, regardless of which manner is used to create ImageView of each application program, all ImageView call initImageView( )(an initial image view interface) to perform general data initialization. Therefore, in this embodiment of this application, a condition-based determining process related to an image optimization permission is added to this interface, to determine whether a current application program has the image optimization permission. The following uses supper-resolution processing as an example for description, as shown in FIG. 8A.

Step 601. An application program creates ImageView to call an initImageView( ) interface to perform data initialization.

Step 602. A plurality of conditions are set in initImageView( ) to determine whether the current application program has an image optimization capability permission, where the conditions are as follows:

(1) whether a preset image optimization capability switch is enabled; (2) whether a mobile phone model supports image optimization; (3) whether a package name of the application program is in a whitelist.

If the foregoing three conditions are met, it can be determined that ImageView currently created by the application program has the image optimization permission, and subsequent determining logic may be continued, that is, step 603 may be performed; otherwise, image optimization processing is not continued, that is, step 605 is performed to draw an image for display.

Because image optimization processing aims to achieve an image quality improvement, and such an improvement has different impact and significance for users in different applications and needs to be differentiated based on importance and a function value. Therefore, at present, image optimization processing is enabled only for some specific applications. In addition, in Android applications, a package (package) name usually corresponds to an application program one by one. Therefore, a package name of the current application program may be obtained by calling getPackageName( ). If the package name of the application program is in the whitelist, it is determined that ImageView allows image optimization, and subsequent scene recognition logic is continued; or if the package name of the application program is not in the whitelist, subsequent behavior of ImageView is with the same as behavior performed without an image optimization feature.

Step 603. An image size is obtained. To continue to determine, based on the image size, whether the image needs image optimization, getIntrinsicWidth( ) and getIntrinsicHeight( ) methods of Drawable in an Android View drawing system may be used to obtain a width and a height of an image, so that a width and a height of a to-be-displayed image can be measured by using these methods. In an example of BitmapDrawable, a width and a height of a held bitmap are actually returned.

Step 604. When a difference between a height of the screen and the height of the to-be-displayed image is less than a first threshold, or when a difference between a width of the screen of the image processing device and the width of the to-be-displayed image is less than a second threshold, that is, when either of the two conditions is met, super-resolution processing is performed on the to-be-displayed image, that is, step 605 is performed; otherwise, step 609 is performed. For example, when the width of the to-be-displayed image meets [0.95, 1.0] times the width of the screen, or when the height of the to-be-displayed image meets [0.95, 1.0] times the height of the screen, it can be determined that a size of the to-be-displayed image is large enough, and therefore image optimization is necessary for the image.

Step 605. ImageView draws specified Drawable data by using a standard method onDraw( ) of View. Content is drawn by using the standard method draw( ) of Drawable. For example, BitmapDrawable is to draw content of a bitmap on ImageView, and ColorDrawable is to paint color on ImageView.

Step 606. It is determined whether a status of a super-resolution optimization algorithm device is normal. When images are displayed in batches, a task queue of the super-resolution optimization algorithm device is congested. Therefore, it is required to determine whether the status of the super-resolution optimization algorithm device is normal. If the status of the super-resolution optimization algorithm device is normal, step 507 is performed; if the status of the super-resolution optimization algorithm device is abnormal, step 509 is performed.

Step 607. In consideration of performance, a memory, and effects, image optimization processing is performed only on images with resolutions in a particular range. Different application programs have different requirements on a resolution value setting rule. For example, a microblog has a higher image resolution requirement than other applications. Image optimization is triggered only when the resolution of the application program is less than the corresponding value setting rule. Therefore, it is required to further determine whether the resolution meets the specified condition. If the resolution meets the specified condition, step 608 is performed; or if the resolution does not meet the specified condition, step 609 is performed.

Step 608. Super-resolution processing is performed on a to-be-displayed image that meets the foregoing condition. The super-resolution algorithm executed for the super resolution is corresponding to an image resolution value setting of the application program. Afterwards, step 605 is repeated, to re-draw and display an optimized image. It should be noted that, after step 605 is performed, the image optimization procedure ends.

Step 609. Though ImageView does not perform image optimization, ImageView still needs to draw specified Drawable data by using a standard method onDraw( ) of View. Content is drawn by using the standard method draw( ) of Drawable, as shown in step 505.

It should be noted that, there is no strict sequence for the foregoing determining. Generally, in this embodiment of this application, it is first determined whether a switch is on, then an image size is measured to determine whether the image size is large enough, and it is further determined whether the resolution is less than the specified standard.

Figure 8B:
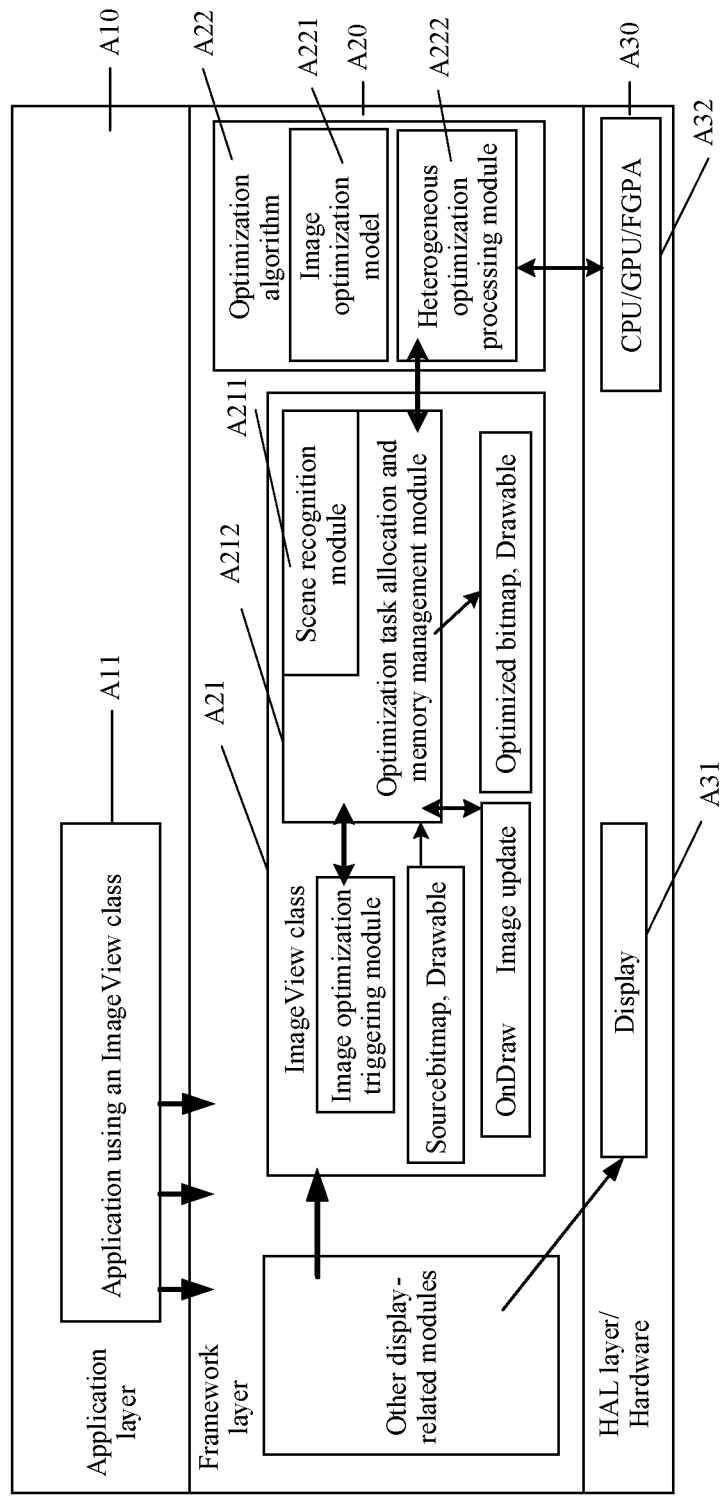
FIG. 8B is schematic flowchart 2 of an image optimization method of an ImageView class according to an embodiment of this application.

FIG. 8B a shows a framework and a procedure for implementing image optimization by using an ImageView class. An operating system includes an application layer A10, a framework A20 and an HAL layer/hardware A30. The application layer A10 has an application program, all that uses ImageView. An image optimization triggering module in ImageView A21 at the framework layer A20 is configured to determine timing for image optimization. A scene recognition module A211 is configured to determine which image needs image optimization processing, for example, determine whether an image size meets a preset condition, whether an image resolution meets a resolution threshold, whether an image includes a human face. Specifically, the foregoing steps 502 to 504 and steps 506 to 507 are included. In practice, different conditions may be set based on image optimization purposes, to determine which image needs image optimization processing. An optimization task allocation and content management module A212 is configured to manage a multi-threaded task and content for image optimization processing, and may be managed by specifically referring to a manner in FIG. 10. An optimization algorithm A22 provides a plurality of image optimization models A221, that is, image optimization algorithms. A heterogeneous optimization processing module A222 is configured to call different processors A32 to accelerate image optimization processing. The HAL layer/hardware is configured to implement display and implement hardware driving of a processor. The application A11 sends an image to ImageView A21. The image optimization triggering module in ImageView A21 determines the timing for image optimization processing. The scene recognition module A 211 determines whether the image needs optimization. The image that needs optimization is put into an optimization task queue. The optimization task allocation and memory management module A212 manages optimization tasks. The optimization algorithm A22 is called to perform optimization processing on images in the optimization task queue. During optimization processing implementation, different processors A32 are called by using the heterogeneous optimization processing module A222 to run the optimization algorithm. An optimized image is used to update the image for display on a display A31.

Figure 9:
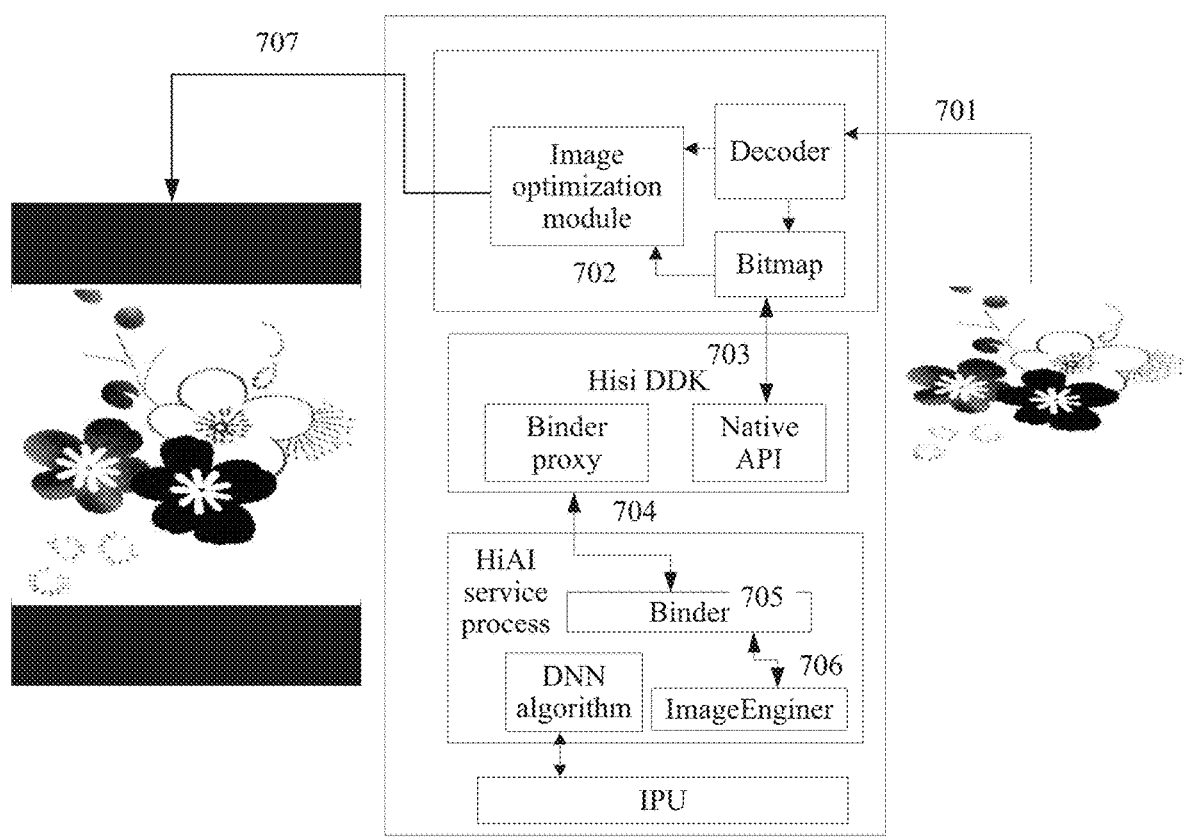
FIG. 9 is a schematic flowchart of an image optimization method of a BitmapFactory class according to an embodiment of this application.

For Manner 2, specifically, a prediction model is provided for image optimization processing in BitmapFactory. The prediction model predicts that super-resolution processing needs to be performed on an image in a display interface, and an image outside the display interface needs to be filtered out. This ensures that image optimization processing can be performed on an image that meets a condition, thereby meeting an end-to-end performance requirement. Specific steps are shown in FIG. 9.

Step 701. An image of an application program decodes a to-be-displayed image by calling BitmapFactory.decode-File( ) of BitmapFactory, and outputs a source bitmap (source bitmap) object, for example, decodes a to-be-displayed image in JPEG format into a bitmap.

Step 702. BitmapFactory calls a BitmapFactory class of a framework layer to import the source bitmap object.

Step 703. An image processing module internally creates/manages a destination bitmap (destination bitmap), and uses a source bitmap and the destination bitmap of the image as parameters to call a native API of a Hisi DDK, to perform data processing.

Step 704. The Hisi DDK uses an internal binder interface to transmit the source bitmap and the destination bitmap to a HiAI service process through inter-process communication (inter-process communication, IPC), to call an IPU for super-resolution algorithm processing.

Step 705. A super-resolution image processed by the HiAI service process is stored in the destination bitmap, and then is asynchronously returned to a binder process of a graphics library process by using a binder interface.

Step 706. After receiving the image processed by the image processing module, the binder process transmits the destination bitmap to a view display interface for redrawing.

Step 707. The redrawn image is displayed on a display interface of the application program.

Because a bitmap is created in the foregoing image optimization processing process, the bitmap is a factor that is most likely to cause a memory exception in most application scenarios. The bitmap complies with a Java GC mechanism. When no strong reference points to a bitmap object, the bitmap object is released. If an improper pointer holds the bitmap, memory occupation or leakage is caused. Therefore, this embodiment of this application explicitly provides a lifecycle of the bitmap in image optimization processing, for ease of memory management. In addition, there are currently numerous image optimization algorithms, and running and computation requirements are high. Different heterogeneous processors such as a GPU and an FPGA may be further managed, and tasks may be allocated to the heterogeneous processors, to accelerate image optimization processing performance.

For example, it is assumed that a first application program is WeChat, a user A sends a selfie to a user B by using WeChat, and a thumbnail of the selfie is displayed in a WeChat dialog box of the user B. When the user B taps the thumbnail to view the selfie, the application program WeChat in a mobile phone of the user B triggers an image processing module of an operating system to perform an image display process. Therefore, ImageView or BitmapFactory in the image processing module performs image optimization on the selfie, and therefore the selfie viewed by the user B has a higher a resolution and higher definition.

In conclusion, according to the foregoing image processing method, the image optimization function does not need to be repeatedly developed for each third-party application program. Super-resolution processing can be triggered by directly calling an existing interface in the operating system. The method is universal.

Figure 10:
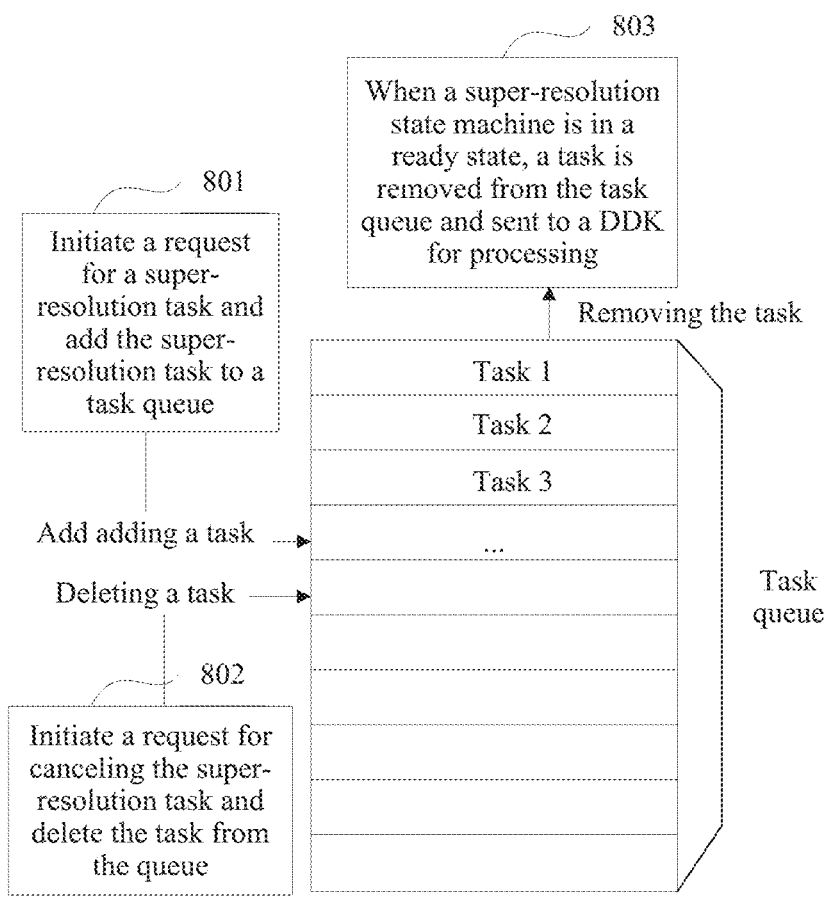
FIG. 10 is a schematic diagram of a control policy method of an image optimization queue according to an embodiment of this application.

In addition, in an embodiment of this application, a control policy is further added for an image optimization queue of an image processing module. As shown in FIG. 10, in step 801, the control policy is mainly as follows: After a request, for a super-resolution task, initiated by the image processing module is received by a task queue, the task is added to the queue; in step 802, if a request, for canceling a super-resolution task, initiated by the image processing module is received, the task is deleted from the queue; and in step 803, when another task queue detects that a super-resolution state machine is in a ready state, a task is removed from the task queue and sent to a DDK for processing.

In addition, in consideration that a bitmap is created in a complete image optimization processing process, the bitmap is a factor that is most likely to cause a memory exception in most application scenarios. The bitmap complies with a Java GC mechanism. When no strong reference points to a bitmap object, the bitmap object is released. If an improper pointer holds the bitmap, memory occupation or leakage is caused. Therefore, this embodiment of this application clarifies a lifecycle of the bitmap in image optimization processing, for ease of memory management.

Figure 11:
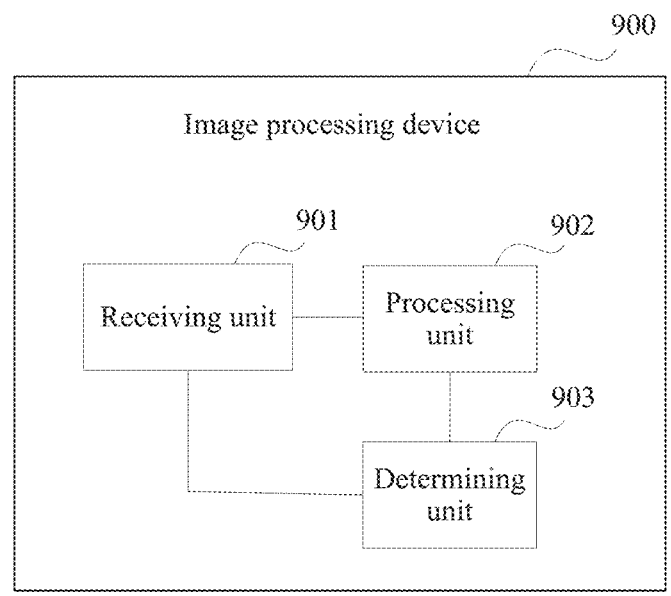
FIG. 11 is a schematic structural diagram of an image processing apparatus according to this application.

Based on a same inventive concept of the method embodiment, an embodiment of this application provides an image processing apparatus 900. The image processing apparatus belongs to a framework layer of an operating system of an image processing device, and is specifically configured to implement the method described in the embodiment shown in FIG. 3. As shown in FIG. 11, a structure of the apparatus includes a receiving unit 901 and a processing unit 902.

The receiving unit 901 is configured to receive an instruction of a first application program to call an image processing module of an operating system, where the instruction carries a to-be-displayed image.

The processing unit 902 is configured to perform image optimization processing on the to-be-displayed image and display an image obtained after the image optimization processing.

In a possible design, the processing unit 902 is specifically configured to: when determining that a resolution of the to-be-displayed image is less than a first threshold, perform super-resolution processing on the to-be-displayed image.

In another possible design, the image processing apparatus further includes a determining unit 903, configured to determine, based on an identifier of the first application program, that the first application program has a super-resolution processing permission.

Further, the determining unit 903 is specifically configured to determine whether the identifier of the first application program exists in a preset whitelist; and if the identifier of the first application program exists in the preset whitelist, determine that the first application program has an image optimization permission.

In a possible design, the processing unit 902 is specifically configured to:

add the to-be-displayed image to a task queue as a task object;

determine, based on the resolution of the to-be-displayed image, an image optimization algorithm corresponding to the to-be-displayed image; and perform, by using the corresponding image optimization algorithm, super-resolution processing on the task object corresponding to the to-be-displayed image in the task queue.

Further, the processing unit 902 is further configured to: after determining that the super-resolution processing on the task object corresponding to the to-be-displayed image is completed, release memory space corresponding to the task object.

In addition, in a possible design, a first task in the task queue is allocated to a first processor to perform super-resolution processing, and a second task in the task queue is allocated to a second processor to perform super-resolution processing, to accelerate image processing.

In a possible design, it is assumed that the image processing apparatus is an ImageView class in the operating system, and the instruction further includes a width and a height of the to-be-displayed image. The processing unit 902 is further configured to determine that the width and the height of the to-be-displayed image meet a specified condition, Where the specified condition is as follows: a difference between a height of a screen of the terminal device and the height of the to-be-displayed image is less than a second threshold; and/or a difference between a width of the screen of the terminal device and the width of the to-be-displayed image is less than a third threshold.

In a possible design, the image processing apparatus is a BitmapFactory class at a framework layer of an Android operating system. In this case, before performing image optimization processing on the to-be-displayed image, the image processing apparatus decodes the to-be-displayed image.

Figure 12:
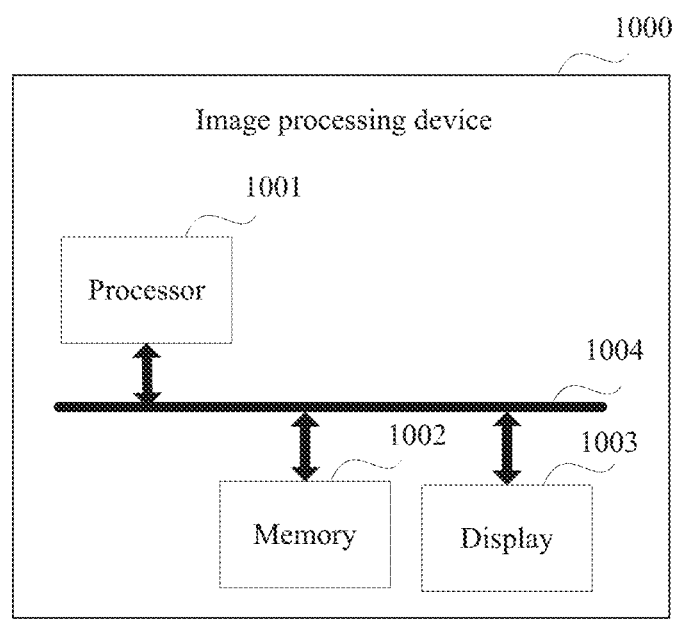
FIG. 12 is a schematic structural diagram of another image processing device according to this application.

According to the foregoing embodiments, an embodiment of this application further provides an image processing device, and the image processing device is configured to implement the method described in the embodiment in FIG. 3. As shown in FIG. 12, the device includes a processor 1001, a memory 1002, and a display 1003.

The processor 1001 may be a central processing unit (central processing unit, CPU), a digital processing unit, or another optimization function.

The memory 1002 is configured to store an instruction of a first application program or a program instruction of an operating system.

The display 1003 is configured to display, on a human-computer interaction interface of the first application program, an image obtained after image optimization processing performed by the processor 1001.

In this embodiment of this application, a specific connection medium between the processor 1001 and the memory 1002 is not limited. In this embodiment of this application, the memory 1002, the processor 1001, and the display 1003 are connected by using a bus 1004 in FIG. 12. The bus is indicated by using a bold line in FIG. 12. A manner of connection between other components is merely an example for description, and imposes no limitation. The bus may be classified into an address bus, a data bus, a control bus, and the like. For ease of representation, only one bold line is used to represent the bus in FIG. 12, but this does not mean that there is only one bus or only one type of bus.

The memory 1002 may be a volatile memory (volatile memory), such as a random-access memory (random-access memory, RAM). Alternatively, the memory 1002 may be a non-volatile memory (non-volatile memory), such as a read-only memory, a flash memory (flash memory), a hard disk drive (hard disk drive, HDD), or a solid-state drive (solid-state drive, SSD). Alternatively, the memory 1002 is, but not limited to, any other medium that can be used to carry or store expected program code in a form of an instruction or a data structure and can be accessed by a computer. The memory 1003 may be a combination of the foregoing memories.

The processor 1001 performs the program instruction in the memory 1002, to implement the image processing method shown in FIG. 3. The method includes: sending, by the first application program, the instruction to the image processing module in the operating system, to call the image processing module to perform an image optimization algorithm; and performing, by the image processing module, image optimization processing on the to-be-displayed image, and returning an optimized image to the first application program for display.

The processor 1001 may use the image optimization processing method in the following manner: when determining that a resolution of the to-be-displayed image is less than a first threshold, performing super-resolution processing on the to-be-displayed image.

In a possible implementation, the instruction of the first application program further includes an identifier of the first application program. The processor 1001 is further configured to determine, based on the identifier of the first application program, that the first application program has a super-resolution processing permission.

An embodiment of this application further provides a computer readable storage medium, configured to store a computer software instruction that needs to be executed by the foregoing processor. The computer readable storage medium includes a program that needs to be executed by the foregoing processor.

An embodiment of this application further provides a computer program product. When the computer program product is executed by a computer, the computer is enabled to perform the foregoing image processing method.

In conclusion, in the embodiments of this application, the image processing module of the operating system of the image processing device is mainly improved, and an image optimization function is added, to perform image optimization processing on to-be-displayed images in different application programs at an application layer. That is, when a multimedia file in the application program calls an interface of the image processing module of the operating system for image display, an image optimization processing process of the image processing module is first performed, and an optimized image is eventually displayed. In this case, a resolution is increased, and higher definition is also achieved. In the embodiments of this application, the image processing module in the operating system is improved and it is unnecessary to develop each application program separately. A user operating an application program at the application layer is unaware of the entire image optimization process. Therefore, the method is highly reusable and more automated.

A person skilled in the art may clearly understand that, descriptions of the embodiments provided in the present invention may be reference for each other. For ease and brevity of description, for functions of the apparatuses and devices and performed steps that are provided in the embodiments of this application, refer to related descriptions in the method embodiment of the present invention. Details are not described herein again.

A person skilled in the art may further understand that various illustrative logical blocks (illustrative logical block) and steps (step) that are listed in the embodiments of this application may be implemented by using electronic hardware, computer software, or a combination thereof. In order to clearly display the interchangeability (interchangeability) between the hardware and the software, functions of the foregoing various illustrative components (illustrative components) and steps have been generally described. Whether the functions are implemented by using hardware or software depends on particular applications and a design requirement of the entire system. A person of ordinary skill in the art may use various methods to implement the described functions for each particular application, but it should not be considered that the implementation goes beyond the scope of the embodiments of this application.

The various illustrative logical blocks, modules, and circuits described in the embodiments of this application may implement or operate the described functions by using a general processing unit, a digital signal processing unit, an application-specific integrated circuit (ASIC), a field programmable gate array (FPGA) or another programmable logical apparatus, a discrete gate or transistor logic, a discrete hardware component, or a design of any combination thereof. The general processing unit may be a microprocessing unit. Optionally, the general processing unit may be any conventional processing unit, controller, microcontroller, or state machine. The processing unit may alternatively be implemented by a combination of computing apparatuses, such as a digital signal processing unit and a microprocessing unit, a plurality of microprocessing units, one or more microprocessing units with a digital signal processing unit core, or any other similar configuration.

Steps of the methods or algorithms described in the embodiments of this application may be directly embedded into hardware, a software module executed by a processing unit, or a combination thereof. The software module may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processing unit so that the processing unit can read information from the storage medium and write information to the storage medium. Optionally, the storage medium may further be integrated into a processing unit. The processing unit and the storage medium may be arranged in an ASIC, and the ASIC may be arranged in a user terminal. Optionally, the processing unit and the storage medium may be arranged in different components of the user terminal.

In one or more designs shown in examples, the functions described in the embodiments of this application may be implemented by using hardware, software, firmware, or any combination thereof. If the functions are implemented by software, these functions may be stored in a computer readable medium or be transmitted to the computer readable medium in a form of one or more instructions or code. The computer readable medium is either a computer storage medium or a communications medium that enables a computer program to move from one place to another. The storage medium may be an available medium that can be accessed by any general or special computer. For example, such a computer readable medium may include but is not limited to a RAM, a ROM, an EEPROM, a CD-ROM, or another optical disc storage, a magnetic disk storage or another magnetic storage apparatus, or any other medium that may be used to carry or store program code, where the program code is in a form of an instruction or a data structure or in a form that can be read by a general or special computer or a general or special processing unit. In addition, any connection may be appropriately defined as a computer readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in a defined computer-readable medium. The disk (disk) and the disc (disc) include a compressed disk, a laser disk, an optical disc, a DVD, a floppy disk, and a Blu-ray disc. The disk generally copies data by a magnetic means, and the disc generally copies data optically by a laser means. The foregoing combination may also be included in the computer-readable medium.

According to the foregoing description in this application, technologies in the art may use or implement the content of this application. Any modification based on the disclosed content shall be considered obvious in the art. The basic principles described in this application may be applied to other variations without departing from the essence and scope of this application. Therefore, the content disclosed in this application is not limited to the described embodiments and designs but may also be extended to a maximum scope that is consistent with the principles and disclosed new features of this application.

What is claimed is:

1. An image processing method implemented by an image processing device comprising an operating system, wherein the image processing method comprises:
   receiving an instruction of an application program-to call an image processing function of the operating system, wherein the instruction carries a to-be-displayed image and an identifier of the application program;
   determining whether the identifier of the application program exists in a preset whitelist;
   determining that the application program has an image optimization permission when the identifier of the application program exists in the preset whitelist;
   performing image optimization processing on the to-be-displayed image; and
   displaying an image obtained after the image optimization processing.

2. The image processing method of claim 1, further comprising performing super-resolution processing on the to-be-displayed image when a resolution of the to-be-displayed image is less than a first threshold.

3. The image processing method of claim 2, wherein the image processing method further comprises determining that the application program has a super-resolution processing permission based on the identifier of the application program.

4. The image processing method of claim 2, further comprising:
   adding the to-be-displayed image to a task queue as a task object;
   determining an image optimization algorithm corresponding to the to-be-displayed image based on the resolution of the to-be-displayed image; and
   performing the super-resolution processing on the task object corresponding to the to-be-displayed image in the task queue using the corresponding image optimization algorithm.

5. The image processing method of claim 4, further comprising releasing memory space corresponding to the task object after the super-resolution processing on the task object corresponding to the to-be-displayed image is completed.

6. The image processing method of claim 4, further comprising:
   allocating a first task in the task queue to a first processor to perform the super-resolution processing; and
   allocating a second task in the task queue to a second processor to perform the super-resolution processing.

7. The image processing method of claim 1, wherein the operating system is an ANDROID operating system, wherein the image processing function is an IMAGEVIEW class at a framework layer of the ANDROID operating system, wherein the instruction further comprises a width and a height of the to-be-displayed image, wherein the image processing method further comprises determining, by the IMAGEVIEW class, that the width and the height of the to-be-displayed image meet a specified condition, and wherein the specified condition is either a difference between a height of a screen of the image processing device and the height of the to-be-displayed image is less than a second threshold, or a difference between a width of the screen of the image processing device and the width of the to-be-displayed image is less than a third threshold.

8. The image processing method of claim 1, wherein the operating system is an ANDROID operating system, the image processing function is a BitmapFactory class at a framework layer of the ANDROID operating system, and wherein the image processing method further comprises decoding, by the BitmapFactory class, the to-be-displayed image.

9. An image processing device, comprising:
   a processor;
   a memory coupled to the processor and storing instructions that, when executed by the processor, cause the image processing device to be configured to:
      receive an instruction of an application program-to call an image processing function of the operating system, wherein the instruction carries a to-be-displayed image and an identifier of the application program;
      determine whether the identifier of the application program exists in a preset whitelist;
      determine that the application program has an image optimization permission when the identifier of the application program exists in the preset whitelist; and
      perform image optimization processing on the to-be-displayed image based on the instruction; and
   a display coupled to the processor and configured to display an image obtained after the image optimization processing.

10. The image processing device of claim 9, wherein the instructions further cause the image processing device to be configured to perform super-resolution processing on the to-be-displayed image when a resolution of the to-be-displayed image is less than a first threshold.

11. The image processing device of claim 10, wherein the instructions further cause the image processing device to be configured to determine that the application program has a super-resolution processing permission based on the identifier of the application program.

12. The image processing device of claim 9, wherein the instructions further cause the image processing device to be configured to:
   add the to-be-displayed image to a task queue as a task object;
   determine an image optimization algorithm corresponding to the to-be-displayed image based on a resolution of the to-be-displayed image; and
   perform super-resolution processing on the task object corresponding to the to-be-displayed image in the task queue using the corresponding image optimization algorithm.

13. The image processing device of claim 12, wherein the instructions further cause the image processing device to be configured to release memory space corresponding to the task object after determining that the super-resolution processing on the task object corresponding to the to-be-displayed image is completed.

14. The image processing device of claim 12, wherein the instructions further cause the image processing device to be configured to:
   allocate a first task in the task queue to a first processor to perform the super-resolution processing; and
   allocate a second task in the task queue allocated to a second processor to perform the super-resolution processing.

15. The image processing device of claim 9, wherein the operating system is an ANDROID operating system, the image processing function is an IMAGEVIEW class at a framework layer of the ANDROID operating system, wherein the instruction further comprises a width and a height of the to-be-displayed image, wherein the instructions further cause the image processing device to be configured to determine that the width and the height of the to-be-displayed image meet a specified condition, and wherein the specified condition is either a difference between a height of a screen of the image processing device and the height of the to-be-displayed image is less than a second threshold, or a difference between a width of the screen of the image processing device and the width of the to-be-displayed image is less than a third threshold.

16. The image processing device of claim 9, wherein the operating system is an ANDROID operating system, wherein the image processing function is a BitmapFactory class at a framework layer of the ANDROID operating system, and wherein the instructions further cause the image processing device to be configured to decode the to-be-displayed image.

17. A computer program product comprising computer-executable instructions stored on a non-transitory computer-readable medium that, when executed by a processor, cause an image processing device to:
   receive an instruction of an application program to call an image function of an operating system, wherein the instruction carries a to-be-displayed image and an identifier of the application program;
   determine whether the identifier of the application program exists in a preset whitelist;
   determine that the application program has an image optimization permission when the identifier of the application program exists in the preset whitelist;
   perform image optimization processing on the to-be-displayed image based on the instruction; and
   display an image obtained after the image optimization processing.

18. The computer program product of claim 17, wherein the instructions further cause the image processing device to perform super-resolution processing on the to-be-displayed image when determining that a resolution of the to-be-displayed image is less than a first threshold.

* * * * *

UNITED STATES PATENT AND TRADEMARK OFFICE
CERTIFICATE OF CORRECTION

PATENT NO. : 11,132,766 B2  
APPLICATION NO. : 16/754567  
DATED : September 28, 2021  
INVENTOR(S) : Kuang Ting Chuang et al.

Page 1 of 1

It is certified that error appears in the above-identified patent and that said Letters Patent is hereby corrected as shown below:

In the Claims

Claim 9, Column 21, Line 20: "program-to call" should read "program to call"

Signed and Sealed this  
Thirtieth Day of November, 2021

Drew Hirshfeld  
*Performing the Functions and Duties of the*  
*Under Secretary of Commerce for Intellectual Property and*  
*Director of the United States Patent and Trademark Office*